US006769119B1

(12) United States Patent
England et al.

(10) Patent No.: US 6,769,119 B1
(45) Date of Patent: Jul. 27, 2004

(54) SYSTEM, METHOD, AND COMPUTER PROGRAM PRODUCT FOR SCOPING OPERATING SYSTEM SEMANTICS IN A COMPUTING ENVIRONMENT SUPPORTING MULTI-ENCLAVE PROCESSES

(75) Inventors: Laurence Edward England, Morgan Hill, CA (US); Tsuneo Horiguchi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/262,287

(22) Filed: Mar. 4, 1999

Related U.S. Application Data

(62) Division of application No. 08/456,513, filed on Jun. 1, 1995, now Pat. No. 5,970,250, which is a division of application No. 08/216,933, filed on Mar. 24, 1994, now abandoned.

(51) Int. Cl.[7] .............................. G06F 9/46; G06F 9/45
(52) U.S. Cl. ....................................... 718/100; 717/143
(58) Field of Search ................................ 717/100, 136, 717/140, 141–149; 709/100–108

(56) References Cited

U.S. PATENT DOCUMENTS

| | | | | |
|---|---|---|---|---|
| 4,692,858 A | * | 9/1987 | Redford et al. ............. | 345/744 |
| 4,800,521 A | * | 1/1989 | Carter et al. ................ | 709/102 |
| 5,060,150 A | | 10/1991 | Simor ......................... | 364/200 |
| 5,313,387 A | | 5/1994 | McKeeman et al. ........ | 364/400 |
| 5,513,349 A | * | 4/1996 | Horiguchi et al. ............ | 360/92 |
| 5,561,736 A | | 10/1996 | Moore et al. .............. | 395/2.69 |
| 5,566,346 A | * | 10/1996 | Andert et al. ................ | 710/8 |
| 5,666,533 A | * | 9/1997 | Horiguchi et al. .......... | 709/100 |
| 5,970,250 A | | 10/1999 | England et al. ............. | 395/708 |

OTHER PUBLICATIONS

House, R.T., "Alternate Scope Rules for Block–Structured Languages," *The Computer Journal*, vol. 29, No. 3, 1986, pp. 253–260.

The Institute of Electrical and Eletronics Engineers, Inc., *IEEE Standards Interpretations for IEEE Std 1003.1–1990 and IEEE Std 2003.1–1992*, Oct. 1994 edition.

The Institute of Electrical and Electronics Engineers, Inc., *Information technology—Portable Operating System Interface (POSIX) Part 1: System Application Program Interface (API) [CLanguage]*, Firsdt Edition Dec. 7, 1990.

The Institute of Electrical and Electronics Engineers, Inc., *Portable Operating System Interface (POSIX) Part 1: System Application Program Interface [API]*, Amendment 1: Realtime Extension [C Language], 1994.

Stevens, W., *Advanced Programming in the UNIX Environment*, Addison–Wesley, 1992, pp. 207, 283 and 284.

\* cited by examiner

*Primary Examiner*—Thomas Lee
*Assistant Examiner*—Syed Ali
(74) *Attorney, Agent, or Firm*—Fay, Sharpe, Fagan, Minnich & McKee, LLP (57) ABSTRACT

Scoping operating system semantics in a computing environment, wherein a process comprising at least one enclave is executing in the computing environment, is disclosed. Such scoping is performed by determining whether an operating system semantic is explicitly directed to the process, or whether the operating system semantic is implicitly directed to the process. If the operating system semantic is explicitly directed to the process, then the operating system semantic is scoped to the process. If the operating system semantic is implicitly directed to the process, then the operating system semantic is scoped to an enclave of the process in which the operating system semantic occurs.

6 Claims, 7 Drawing Sheets

SYSTEM, METHOD, AND COMPUTER PROGRAM PRODUCT FOR SCOPING OPERATING SYSTEM SEMANTICS IN A COMPUTING ENVIRONMENT SUPPORTING MULTI-ENCLAVE PROCESSES

This application is a divisional application of application Ser. No. 08/456,513 filed Jun. 1, 1995, issued as U.S. Pat. No. 5,970,250, which is a divisional application of application Ser. No. 08/216,933 filed Mar. 24, 1994, now abandoned.

DESCRIPTION

TECHNICAL FIELD

The present invention relates to systems and methods for scoping operating system semantics in a computing environment which supports multi-enclave processes (that is, processes having multiple enclaves).

BACKGROUND ART

An operating system interface standard is a specification that defines the interface between operating systems which conform to the standard and application programs which are written to comply with the standard. Operating system interface standards are advantageous for a number of reasons, including enhanced portability. For example, applications which conform to an operating system interface standard are theoretically portable at the source code level to all computer systems having operating systems which conform to the standard. The portable operating system interface (POSIX) standard is an example of an operating system interface standard.

A computer programming language standard is a specification which defines the syntax and operation of a computer programming language. Various computer programming language standards exist, such as the ANSI and ISO standards for the C, COBOL, Fortran, and PL/I computer programming languages.

Operating system interface standards and computer programming language standards typically specify semantic scoping rules which define the breath (or scope) of semantics, such as variable and function declarations and name resolutions. Semantic scoping rules are discussed in many publicly available documents, such as Alfred V. Aho, Ravi Sethi, and Jeffrey D. Ullman, Compilers: Principles, Techniques, and Tools, Addison-Wesley Publishing Company, 1988, which is herein incorporated by reference in its entirety.

As used herein, the term "semantic" refers to an action which is taken as a result of executing a command or instruction contained, for example, in a computer program or a library routine. Distinction is made herein between "language semantics", which are semantics defined by computer programming language standards, and "operating system semantics", which are semantics defined by operating system interface standards.

Some operating system interface standards, such as the Portable Operating System Interface (POSIX) standard (discussed below), supports the following program execution constructs: processes and threads. A process is defined as including an address space, one or more threads that execute within that address space, and the system resources required by the threads. An application program includes one or more processes. A thread is defined as being a single flow of control within a process. Each thread has its own required resources to support its flow of control.

An "enclave" is another program execution construct, and represents an extension of a computer programming language standard. Enclaves are generally well known. An enclave comprises one or more threads. A process comprises one or more enclaves. Other names for enclaves exist. For example, in COBOL this program execution construct is called a "run unit".

Where multi-enclave processes are permitted, enclaves define the scope of language semantics within processes. In other words, language semantics are scoped to the enclaves in which they respectively occur. For example, an enclave defines the scope of the language name resolutions in a process, such as those for Fortran COMMON or COBOL external program constructs or the scope of a main routine and the associated language semantics such as those of a "STOP" statement.

The scoping specifications typically defined by operating system interface standards do not specify the behavior of application programs in environments which allow a process to contain multiple enclaves, particularly with regard to the scoping of operating system semantics. Consequently, the run-time behavior of such application programs is unpredictable. This problem is further described with reference to FIG. 1, which is a high-level block diagram of a conventional computer system 102.

Figure 1:
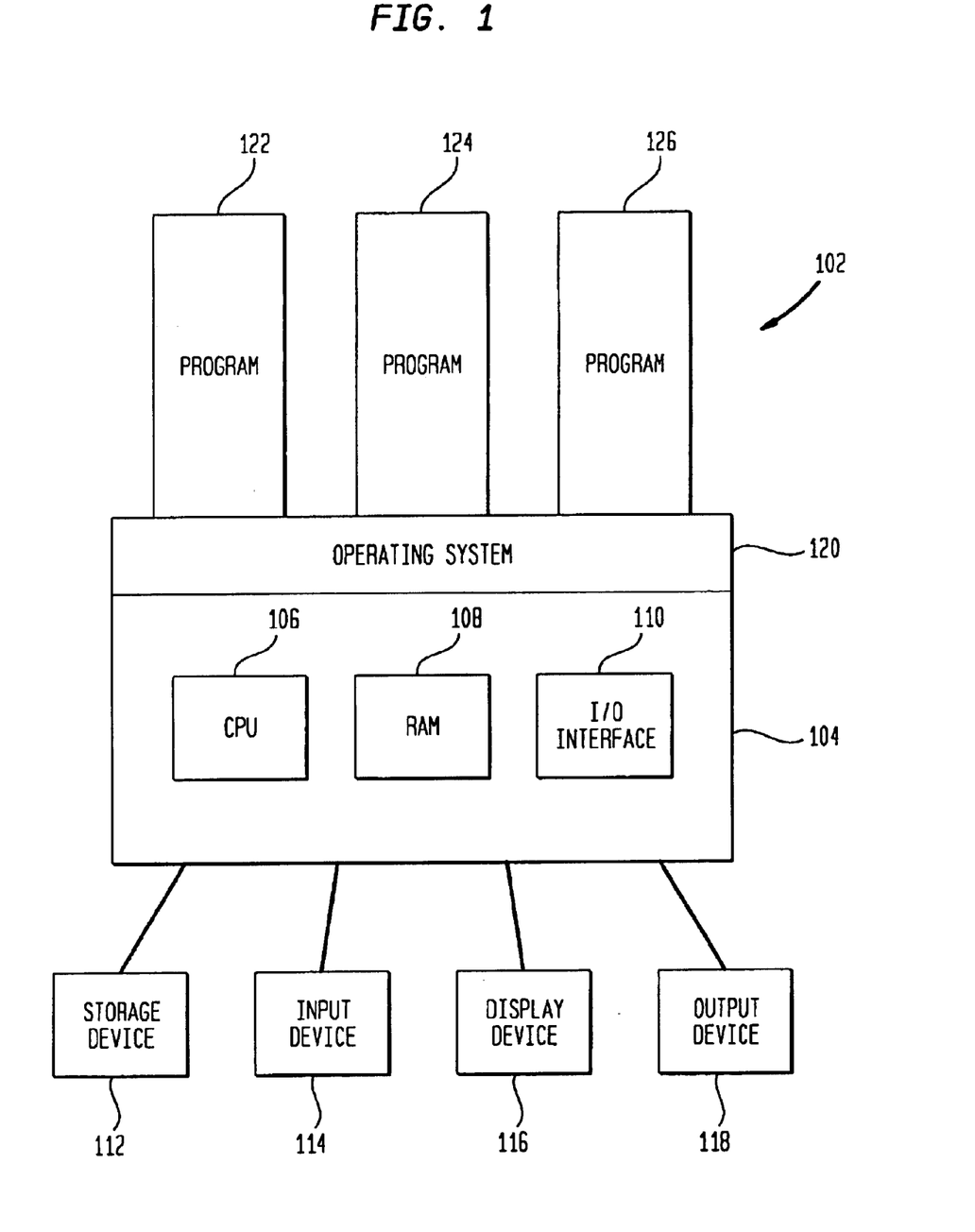
FIG. 1 is a block diagram of a conventional computer system used to illustrate the problems addressed by the present invention.

The computer system 102 includes hardware components 104 such as one or more central processing units (CPU) 106, a random access memory (RAM) 108, and an input/output (I/O) interface 110. The computer system 102 also includes an operating system 120. Various peripheral devices are connected to the computer system 102, such as secondary storage devices 112 (such as a hard drive), input devices 114 (such as a keyboard and/or a mouse), display devices 116 (such as a monitor), and output devices (such as printers) 118.

A plurality of application programs 122, 124, 126 execute in the computer system 102. The application programs 122, 124, 126 may execute sequentially in the computer system 102, but preferably execute in parallel in the computer system 102.

Assume that enclaves (and processes having multiple enclaves) are permitted in the computer system 102, and that the operating system 120 conforms to an operating system interface standard that does not define the behavior of multi-enclave processes. Thus, the scoping of operating system semantics are undefined in the computer system 102. Specifically, an ambiguity exists as to whether operating system semantics are scored to the process or to the enclaves contained in the process. As a result of this ambiguity, the run-time behavior of application programs 122, 124, 126 is unpredictable.

Thus, what is required is a method and system for defining the behavior of computer programs pertaining to the scoping of operating system semantics where the computer programs execute in an extended environment which allows a process to contain multiple enclaves.

DISCLOSURE OF INVENTION

The present invention is directed to a system and method of scoping operating system semantics in a computing environment, wherein a process comprising at least one enclave is executing in the computing environment. The present invention operates by determining whether an operating system semantic is explicitly directed to the process. If the operating system semantic is explicitly directed to the process, then the operating system semantic is scoped to the process.

The present invention also determines whether the operating system semantic is implicitly directed to the process. If the operating system semantic is implicitly directed to the process, then the operating system semantic is scoped to an enclave of the process in which the operating system semantic occurs.

The foregoing and other objects, features and advantages of the invention will be apparent from the following more particular description of preferred embodiments of the invention, as illustrated in the accompanying drawings.

BRIEF DESCRIPTION OF DRAWINGS

The present invention will be described with reference to the accompanying drawings, wherein:

FIGS. 5A–5B depict an example process before and after an "exec" function is invoked. FIGS. 5A–5B are used to illustrate the manner in which the present invention preferably scopes "exec" functions; and FIGS. 6A–6B depict an example process scenario before and after a "fork" function is invoked. FIGS. 6A–6B are used to illustrate the manner in which the present invention preferably scopes the "fork" function.

BEST MODE FOR CARRYING OUT THE INVENTION

1. Overview of the Present Invention

The present invention is directed to a method and system for defining the behavior of computer programs pertaining to the scoping of operating system semantics where the computer programs execute in an extended environment which allows a process to contain multiple enclaves, and where the operating system in the extended environment does not define the behavior of multi-enclave processes. More particularly, the present invention is directed to a method and system for ensuring that operating system semantics in an environment supporting multiple enclave processes are scoped in a consistent, predictable, and effective manner.

Figure 2:
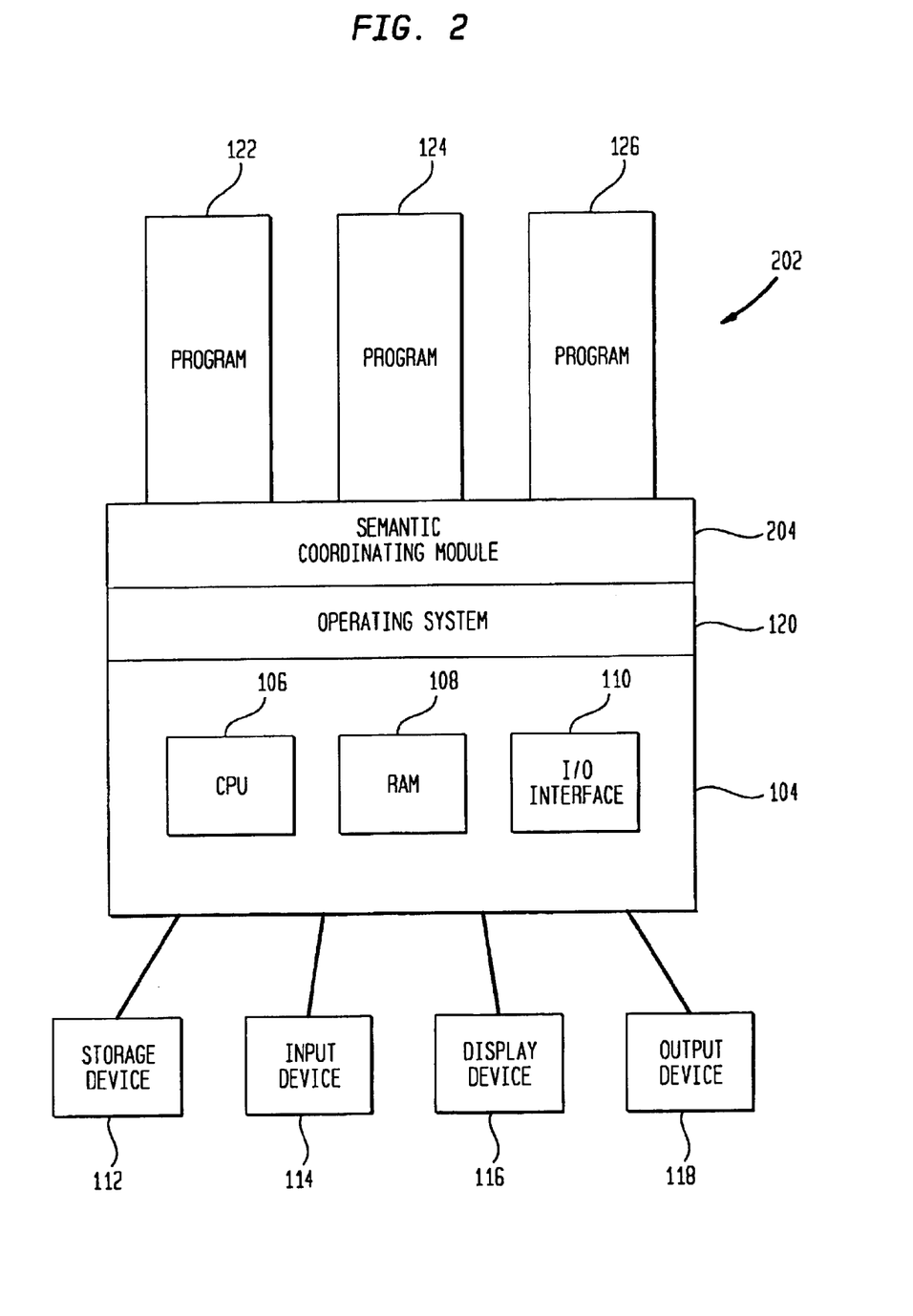
FIG. 2 is a block diagram of a computer system according to an embodiment of the present invention.

FIG. 2 is a block diagram of a computer system 202 according to an embodiment of the present invention. The computer system 202 is similar to the computer system 102 shown in FIG. 1, in that both computer systems 102 and 202 include hardware components 104 (such as one or more CPUs 106, a RAM 108, and an I/O interface 110), an operating system 120, and various peripheral devices (such as secondary storage devices 112, input devices 114, display devices 116, and output devices 118).

Unlike the computer system 102 of FIG. 1, however, the computer system 202 of FIG. 2 includes a semantic coordinating module 204. Preferably, the semantic coordinating module 204 implements the method of the present invention.

The semantic coordinating module 204 can be implemented in any number of ways. For example, the semantic coordinating module 204 can be implemented as an extension of the operating system 120 (in which case the semantic coordinating module 204 would be part of the operating system 120). Alternatively, the semantic coordinating module 204 can be embedded in the run-time environment (not shown) of the application programs 122, 124, 126 which execute in the computer system 202. Alternatively, the semantic coordinating module 204 can be implemented as an extension of a combination of the operating system 120 and the run-time environment. The semantic coordinating module 204 could also be implemented as an application program which executes in the computer system 202, such as program 126. These and other implementations of the semantic coordinating module 204 will be apparent to persons skilled in the relevant art based on the description of the semantic coordinating module 204 contained herein.

Preferably, the computer system 202 is the well known System/390 family of computers produced by International Business Machines (IBM) Corporation of Armonk, New York. Preferably, a run-time environment is established in the computer system 202 using the well known SAA AD/Cycle Language Environment/370 produced by IBM (SAA stands for Systems Application Architecture; AD stands for Application Development). However, it should be understood that other computers and/or run-time environments could alternatively be used in the computer system 202 without departing from the scope and spirit of the present invention. System/390, SAA, and AD/Cycle are registered trademarks of International Business Machines Corporation.

A computer program product comprising a computer readable media having computer program logic recorded thereon, wherein the computer program logic when executed in the computer system 202 enables the computer system 202 to implement the method of the present invention, may be read by and stored on the secondary storage device 112. The computer program logic may then be loaded into the RAM 108, and executed by the CPU 106 of the computer system 202. When executing in the CPU 106, the computer program logic is represented by the semantic coordinating module, as shown in FIG. 2.

2. Overview of the POSIX Operating System Interface Standard

Preferably, the operating system 120 in the computer system 202 is one which conforms to the Portable Operating System Interface (POSIX) standard. The POSIX standards relevant to the present invention are defined in terms of the well known C computer programming language.

POSIX, which is a UNIX based operating system interface standard, is described in many publicly available documents, such as Information Technology-Portable operating System Interface (POSIX)—Part 1: System Application Program Interface (API) (C Language), published by the Institute of Electrical and Electronics Engineers, International Standard ISO/IEC 9945-1:1990, IEEE Standard 1003.1-1990, 1990, and Draft Standard for Information Technology-Portable Operating System Interface (POSIX)—Part 1: System Application Program Interface (API)—Amendment 2: Threads Extension (C Language), published by the Institute of Electrical and Electronics Engineers, IEEE Standard P1003.4a/D8, 1993, which are herein incorporated by reference in their entireties.

Specifically, the operating system 120 is preferably the well known MVS/ESA (Multiple Virtual Storage System/Enterprise Systems Architecture) operating system produced by IBM. It should be understood, however, that other operating systems based on other operating system interface standards could alternatively be used without departing from the scope and spirit of the present invention. In particular, other UNIX based standards, specifications, or implementations could alternatively be used. MVS/ESA is a trademark of International Business Machines Corporation. UNIX is a registered trademark of American Telegraph and Telephone (AT&T).

Features of POSIX which are relevant to the present invention shall now be generally described. These features of POSIX are well known. They are discussed below for the convenience of the reader.

As noted above, POSIX supports the following program execution constructs: processes and threads. A process is defined as including an address space, one or more threads that execute within that address space, and the system resources required by the threads. An application program includes one or more processes. A thread is defined as being a single flow of control within a process. Each thread has its own required resources to support its flow of control.

An "enclave" is another program execution construct, and represents an extension of a computer programming language standard. Enclaves are generally well known. An enclave comprises one or more threads. A process comprises one or more enclaves. Other names for enclaves exist. For example, in COBOL this program execution construct is called a "run unit".

Figure 3A:
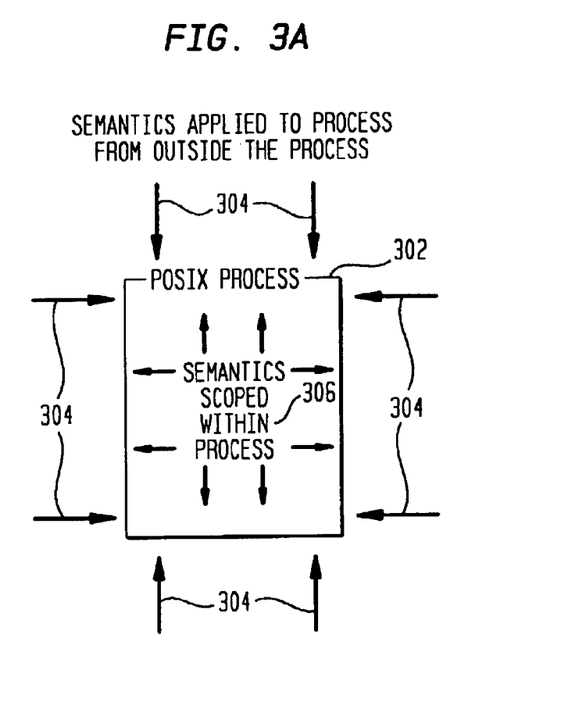
FIGS. 3A–3D depict operating system semantic scoping rules preferably employed by the present invention.

POSIX allows operating system semantics to be scoped at the process level (this is depicted in FIG. 3A, where operating system semantics 304 directed to a process 302 are scoped within the process 302, such semantics scoped within the process 302 being designated with reference number 306). For example, POSIX defines the scope of an environment variable to be a process. Also, in POSIX a signal handler may be established which is scoped to a process. Further POSIX scoping rules are discussed in many publicly available documents, such as Information Technology-Portable Operating System Interface (POSIX)—Part 1: System Application Program Interface (API) (C Language) and Draft Standard for Information Technology-Portable Operating System Interface (POSIX)—Part 1: System Application Program Interface (API)—Amendment 2: Threads Extension (C Language), cited above.

In contrast, where multi-enclave processes are permitted, language semantics are scoped at the enclave level. For example, an enclave defines the scope of language name resolutions in a process, such as those for Fortran COMMON or COBOL external program constructs or the scope of a main routine and the associated language semantics such as those of a "STOP" statement.

POSIX does not specify the behavior of application programs in environments which permit multi-enclave processes, particularly with regard to the scoping of operating system semantics. Thus, in a computer system which permits multi-enclave processes, and where the operating system of the computer system is based on the POSIX standard, there is uncertainty as to whether operating system semantics are scoped to processes (in accordance with POSIX) or are scoped to the enclaves contained in the processes (in accordance with the scoping rules associated with enclaves). The present invention resolves this uncertainty.

3. Operation of the Present Invention

The operation of the semantic coordinating module 204 shall now be generally described.

If an operating system semantic is explicitly directed or scoped to a process according to the operating system interface standard, then the semantic coordinating module 204 scopes (or applies) the semantic to the entire process. This is the case, even if the process includes multiple enclaves.

Figure 3B:
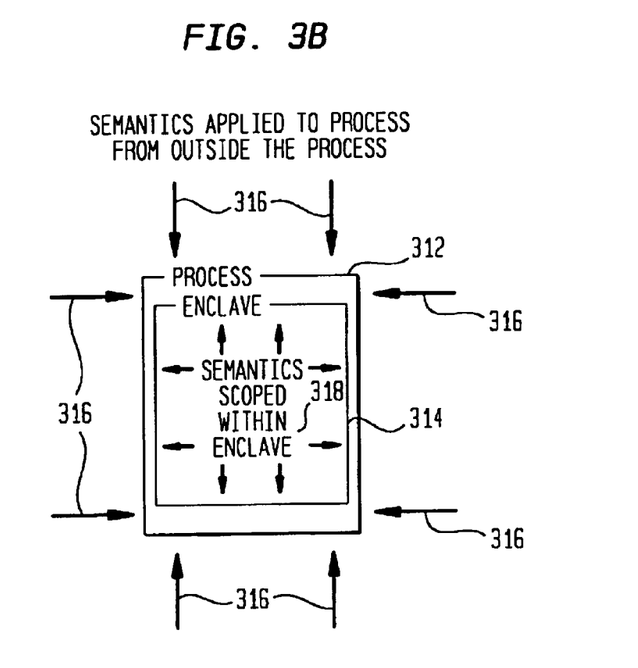
Figure 3C:
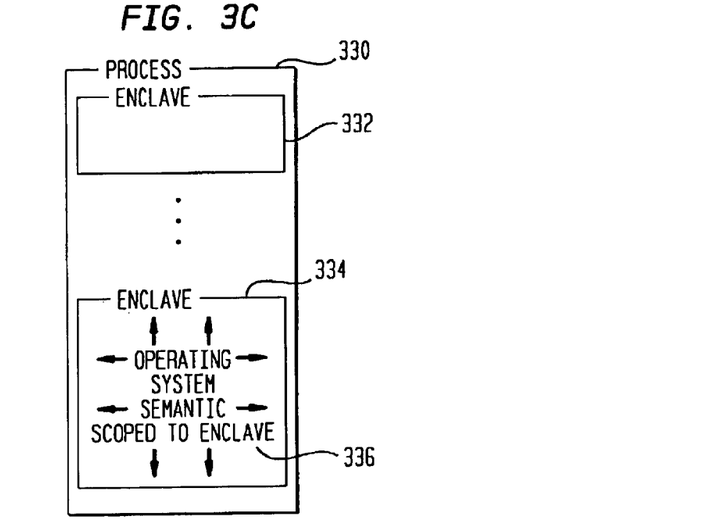
Figure 3D:
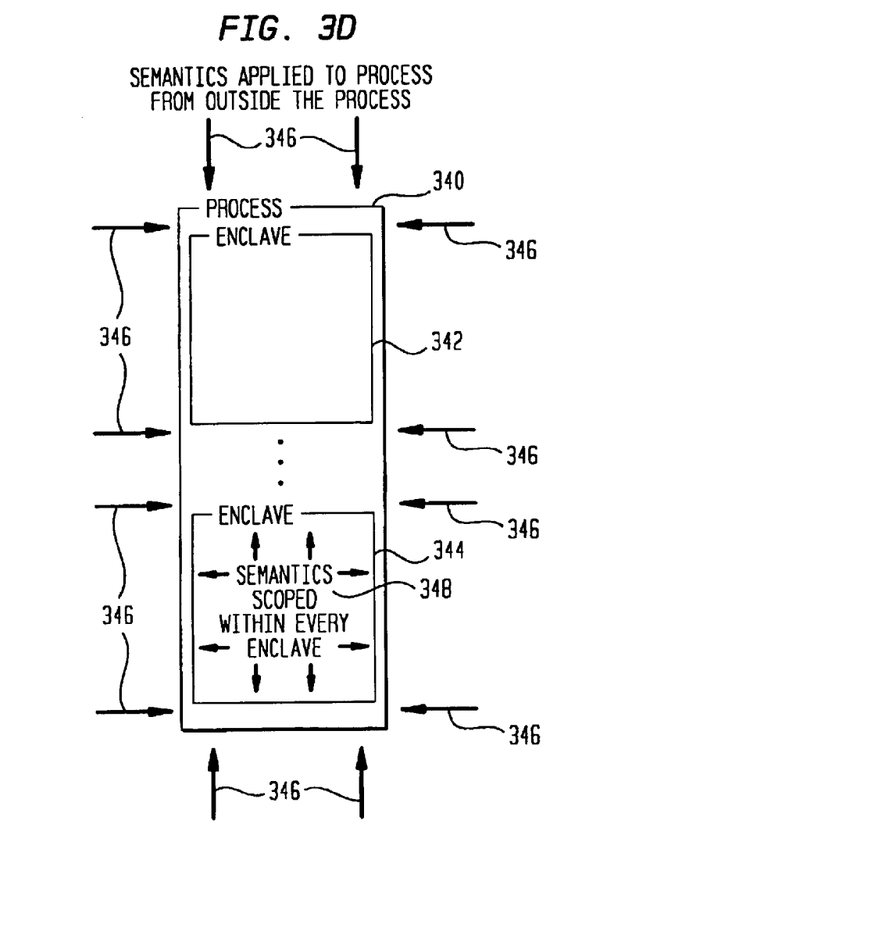

Such operating system semantics which are scoped at a process level by the present invention include interprocess communication (IPC) signals defined by POSIX which are directed to a process from entities external to the process (such as other processes). See, for example, FIG. 3D which shows a multi-enclave process 340 that is receiving operating system semantics 346 from external entities (not shown). The operating system semantics 346 are scoped to the entire process 340 (in other words, the operating system semantics are scoped to every enclave 342, 344). Such semantics scoped to the process 340 are represented by reference number 348.

If an operating system semantic is implicitly directed or scoped to the current process (that is, the process in which the semantic occurs or is invoked), then the semantic coordinating module 204 scopes (or applies) the semantic to the current enclave within the process (that is, the enclave in which the semantic occurs or is invoked).

Such operating system semantics which are scoped at an enclave level by the present invention include the sigaction( ) function defined by POSIX. This function allows a calling thread in an enclave (called the current enclave) to specify an action to be associated with a particular signal (also called errors and conditions). Since sigaction( ) is scoped to the current enclave, threads in other enclaves may specify other actions for the same signal.

Other operating system semantics which are scoped at an enclave level by the present invention include variable declarations and function invocations. See, for example, FIG. 3C which shows a process 330 which includes multiple enclaves 332, 334. The enclave 334 includes an operating system semantic 336 that is implicitly scoped to the current process 330. According to the present invention, the semantic coordinating module 204 scopes the semantic 336 to the enclave in which the semantic 336 occurs or is invoked, that is, the enclave 334.

If a process includes only one enclave, then the semantic coordinating module 204 scopes all operating system semantics involving the process to the entire process (which is equivalent to the enclave). This is shown, for example, in FIG. 3B wherein a process 312 is shown having a single enclave 314. Enclave 314 is equivalent to process 312 and, thus, scoping operating system semantics 316 to enclave 314 is equivalent to scoping operating system semantics 316 to process 312, and visa versa. Such semantics scoped within the enclave 314 and the process 312 are designated with reference number 318.

Figure 4:
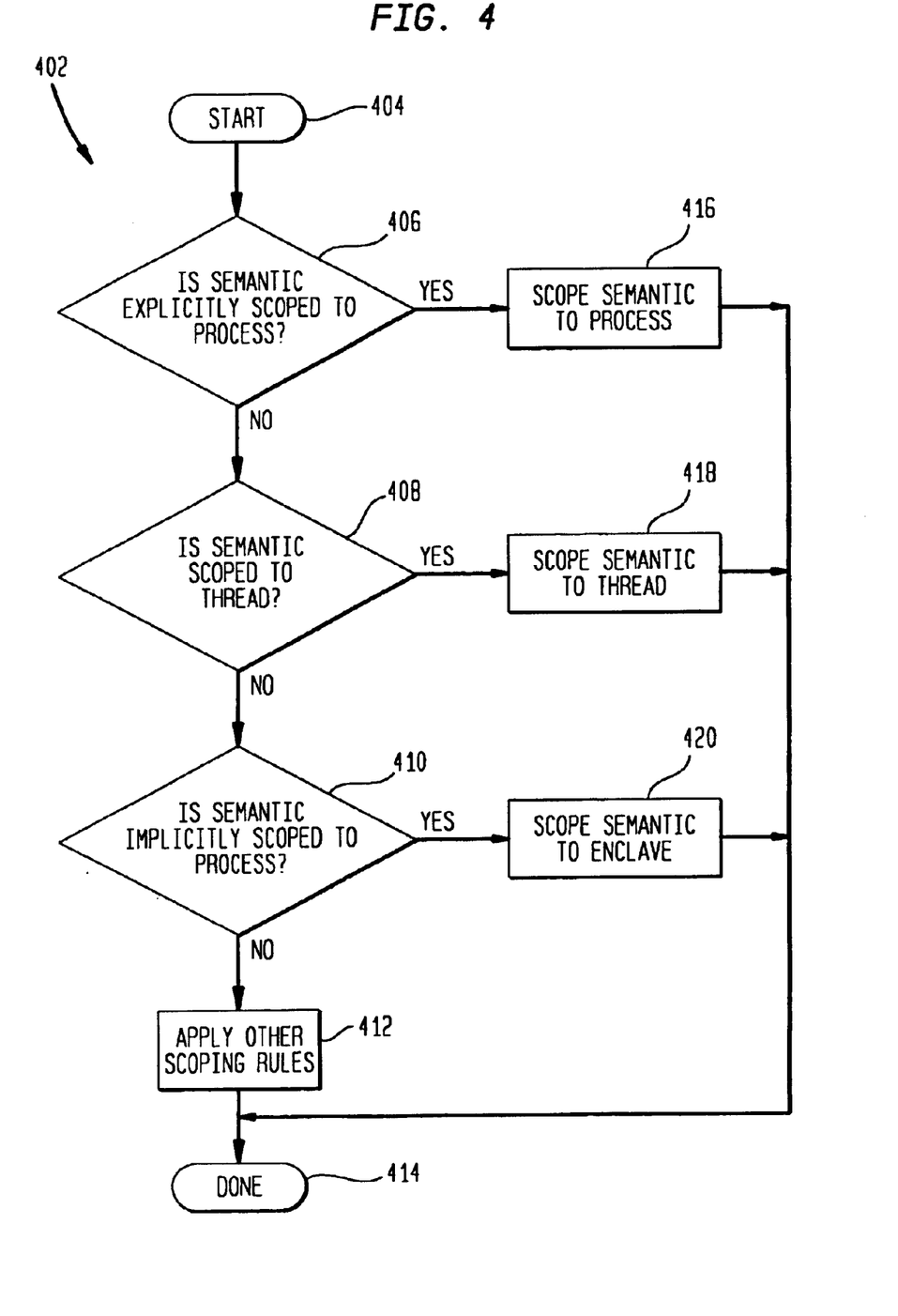
FIG. 4 is a flowchart illustrating the operation of a semantic coordinating module according to a preferred embodiment of the present invention.

The present invention shall now be described in greater detail with reference to FIG. 4, which illustrates a flowchart 402 depicting the operation of the semantic coordinating module 204. The steps of flowchart 402 are performed for each operating system semantic to determine the scope of the operating system semantic. The flowchart 402 is of sufficient detail to enable one skilled in the relevant art to generate a computer program or a computer program product in accordance with the present invention. FIG. 4 starts with step 404, where control immediately passes to step 406.

In step 406, the semantic coordinating module 204 determines whether the operating system semantic under consideration is explicitly directed or scoped to a process. An operating system semantic is explicitly directed or scoped to a process by, for example, including the identification of the process as a part of the invocation (that is, as a passed parameter) of the semantic. One such semantic, for example, is the "kill" function defined by POSIX which operates to send a signal to the process identified in the invocation of "kill".

If the operating system semantic is explicitly scoped to a process, then step 416 is performed. In step 416, the semantic coordinating module 204 scopes the operating system semantic to the entire process. This is the case, even if the process contains multiple enclaves. The execution of flowchart 402 is complete after step 416 is performed, as indicated by step 414.

As discussed above, operating system semantics which are scoped at a process level by the present invention include interprocess communication (IPC) signals defined by POSIX which are directed to a process from entities external to the process, such as other processes (it is noted that the POSIX "kill" function operates to send a signal to a process specified in the invocation of "kill," and thus "kill" is scoped at the process level). Thus, alternatively in step 406 the semantic coordinating module 204 determines whether the operating system semantic under consideration is directed or scoped to a process (called the target process) from an entity external to the process. If so, then the semantic coordinating module 204 scopes the semantic to the entire target process, as indicated by step 416.

If, in step 406, the semantic coordinating module 204 determines that the operating system semantic is not explicitly scoped to a process, then step 408 is performed.

In step 408, the semantic coordinating module 204 determines whether the operating system semantic is scoped to a thread. In POSIX, an operating system semantic may be implicitly directed to the current thread (that is, the thread in which the semantic occurs or is invoked) or may be explicitly directed to a thread identified in the invocation of the semantic. For example, the sigprocmask( ) function defined by POSIX is implicitly scoped to the current thread. The pthread_kill( ) function defined by POSIX is explicitly scoped to a thread identified in the invocation of the pthread_kill( ) function.

If it is determined in step 408 that the operating system semantic is implicitly or explicitly scoped to a thread, then step 418 is performed. In step 418, the semantic coordinating module 204 scopes the operating system semantic to the thread. The execution of flowchart 402 is complete after step 418 is performed, as indicated by step 414.

If, in step 408, the semantic coordinating module 204 determines that the operating system semantic is not scoped to a thread, then step 410 is performed.

In step 410, the semantic coordinating module 204 determines whether the operating system semantic under consideration is implicitly directed or scoped to the current process (that is, the process in which the semantic occurs or is invoked). If the semantic is implicitly scoped to the current process, then step 420 is performed.

In step 420, the semantic coordinating module 204 scopes the operating system semantic to the current enclave contained within the process (that is, the enclave in which the semantic occurs or is invoked). In the case where the current enclave is the only enclave in the process, then the performance of step 420 operates to scope the operating system semantic to the entire process (see FIG. 3B). The execution of flowchart 402 is complete after step 420 is performed, as indicated by step 414.

If, in step 410, the semantic coordinating module 204 determines that the operating system semantic is not implicitly scoped to the current process, then step 412 is performed.

In step 412, the semantic coordinating module 204 applies additional scoping rules to define the scope of the operating system semantic being considered. These additional scoping rules are dependent on the particular characteristics of the operating system interface standard upon which the operating system 120 in the computer system 202 is based. The additional scoping rules which are discussed below are specific to the POSIX standard. However, it should be understood that other scoping rules adapted for operation with other operating system interface standards may alternatively be used depending on the actual implementation of the operating system 120.

In step 412, then, the semantic coordinating module 204 applies the following scoping rules to define the scope of the operating system semantic being considered: (a) scoping rules related to POSIX entities and attributes; (b) scoping rules related to "exec" interoperability; and (c) scoping rules related to "fork" interoperability. These scoping rules are discussed below.

3.1 Scoping Rules Related to POSIX Entities and Attributes

Preferably, in step 412 the semantic coordinating module 204 scopes the POSIX entities and attributes in Table 1 to the entire processes in which they respective occur (that is, created). Generally, these entities and attributes are generally related to identifications of a process or processes (called a process group) or other program execution entities which are closely coupled to a process or process group.

According to the present invention, these entities and attributes are unchanged on the creation of a new enclave from another enclave. All enclaves within a process have the same values or states for these entities and attributes.

TABLE 1

| POSIX Entities and Attributes |
| --- |
| process identification (ID) |
| parent process ID |
| process group ID |
| session membership |
| real user ID |
| effective user ID |
| real group ID |
| effective group ID |
| supplementary group ID |
| current working directory |
| root directory |
| open file descriptors |
| open directory streams |
| system name |
| process time |

Also in step 412 the semantic coordinating module, 204 scopes the POSIX entities and attributes in Table 2 to the respective enclaves in which they respectively occur (that is, created). Generally, these entities and attributes are closely tied to the scope of the language semantics.

Each enclave within a process has its own values and states of these entities and attributes (even though the initial values or states for some may be inherited from the creating enclave). It is noted that the POSIX entities and attributes listed in Tables 1 and 2 are discussed in many publicly available documents, such as Information Technology-Portable Operating System Interface (POSIX)—Part 1: System Application Program Interface (API) (C Language) and Draft Standard for Information Technology-Portable Operating System Interface (POSIX)—Part 1: System Application Program Interface (API)—Amendment 2: Threads Extension (C Language), cited above.

TABLE 2

POSIX Entities and Attributes environment variables
file mode creation mask
file locks
static data
heap data
signal actions

3.2 Scoping Rules Related to "exec" Interoperability

POSIX defines an "exec" family of functions (that is, execl( ), execv( ), excle( ), execve( ), execlp( ), and execvp( )). As specified by the POSIX standard, these functions operate to replace the current process image (that is, the process which invoked one of these functions) with a new process image. The POSIX "exec" family of functions are described in many publicly available documents, such as Information Technology-Portable Operating System Interface (POSIX)—Part 1: System Application Program Interface (API) (C Language) and Draft Standard for Information Technology-Portable Operating System Interface (POSIX)—Part 1: System Application Program Interface (API)—Amendment 2: Threads Extension (C Language), cited above.

According to the present invention, the semantic coordinating module 204 scopes the "exec" family of functions to the enclave level. If a thread within an enclave (called the current enclave) invokes an "exec" function, then all threads within the current enclave are terminated. Also, a new thread (called the target thread) is created in a new enclave.

Figure 5A:
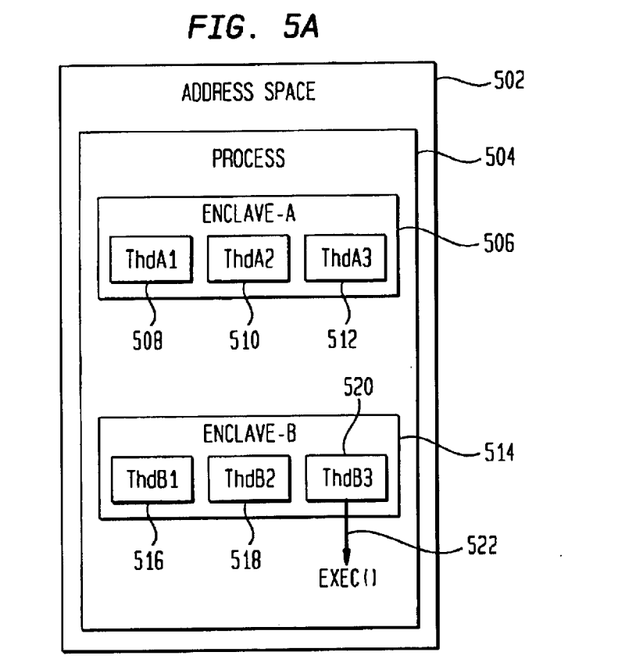
Figure 5B:
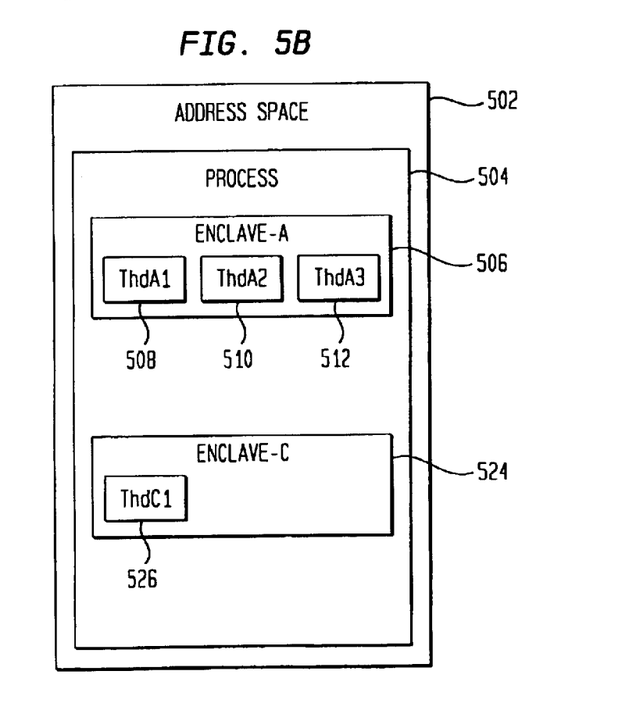

See, for example, FIGS. 5A and 5B which depict a Process 504 in an address space 502 before and after the invocation of an "exec" function. Referring first to FIG. 5A, an Enclave A 506 includes threads ThdA1 508, ThdA2 510, and ThdA3 512. An Enclave B 514 includes three threads ThdB1 516, ThdB2 518, and ThdB3 520. Thread ThdB3 520 invokes an "exec" function 522. As shown in FIG. 5B, all of the threads 516, 518, and 520 in Enclave B 514 have been terminated (and, thus, Enclave B 514 is not shown), and a new thread ThdC1 526 has been created in a new Enclave C 524.

Note that, according to the present invention, termination of threads is limited (or scoped) to the current enclave, rather than the process which contains the current enclave. Also, a new thread is created in a new enclave, rather than creating a new process.

According to the present invention, threads are terminated without invoking any user exit for signals for the termination. The process ID is retained across the invocation of "exec".

3.3 Scoping Rules Related to "fork" Interoperability

POSIX defines a "fork" function which operates to create a new process. As defined by POSIX, the new process (called the child process) is an exact copy of the calling process (called the parent process) with the exceptions noted in POSIX.

According to the present invention, the semantic coordinating module 204 scopes the fork function to the process in some respects, to the enclave in some respects, and to the thread in some respects. Specifically, if a multi-thread process calls the fork function, then a new process is created. Further, a new enclave is created in the new process wherein the new enclave corresponds to the parent enclave (that is, the enclave from which the fork function was called). However, only the parent thread (that is, the thread which called the fork function) is copied to the new enclave.

Figure 6A:
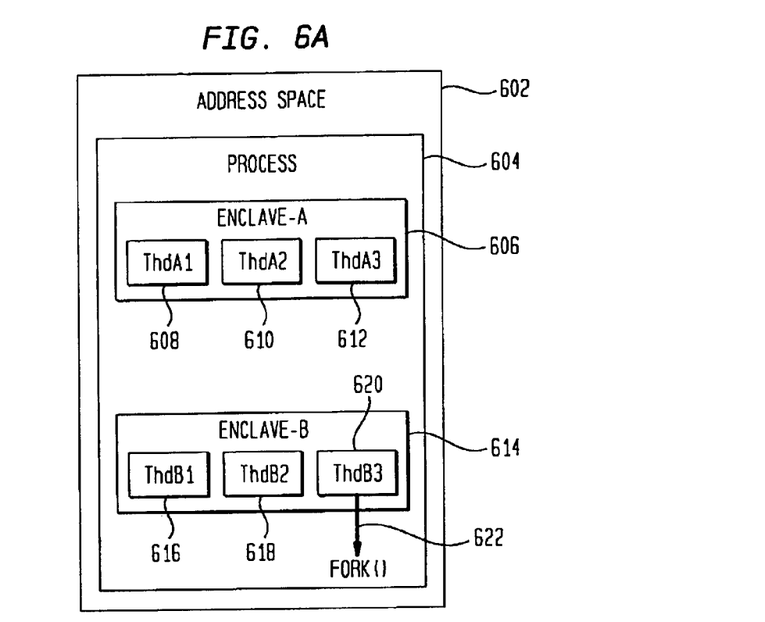
Figure 6B:
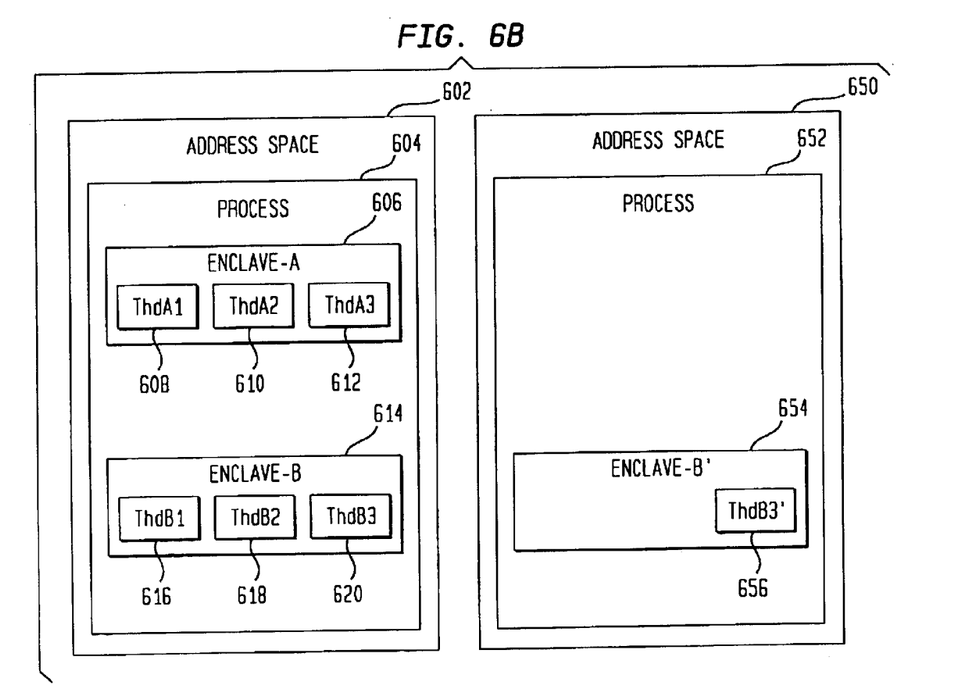

This is shown, for example, in FIGS. 6A and 6B. FIG. 6A shows a Process 604 in an address space 602 having Enclaves A 606 and B 614. Enclave A 606 includes threads ThdA1 608, ThdA2 610, and ThdA3 612. Enclave B 614 includes three threads ThdB1 616, ThdB2 618, and ThdB3 620. Thread ThdB3 620 invokes the fork function 622. As shown in FIG. 6B, a new Process 652 in a new address space 650 has been created. A new Enclave B' 654 has been created in the new Process 652. The parent thread ThdB3 620 from Process 604 has been copied to the new Enclave B' 654. This copied thread contained in the new Enclave B' 654 is represented by reference number 656.

4. Alternate Embodiments of the Present Invention

Alternate embodiments for defining the behavior of computer programs pertaining to the scoping of operating system semantics exist. For example, according to a first alternative embodiment of the present invention, the semantic coordinating module 204 scopes all process level POSIX semantics to the process level, even for multiple-enclave processes. However, this approach may make the program execution behavior of applications with multiple-enclave processes inconsistent and incompatible with existing language specifications.

According to a second alternative embodiment of the present invention, the semantic coordinating module 204 scopes all process level POSIX semantics to the enclave level. However, this approach requires more extensive extensions to the POSIX standard. This requires, for example, associating a POSIX process ID to each enclave to define semantics for functions directed to a specific process or processes, or implicitly selecting an enclave within a process for POSIX semantics directed to a process.

According to an alternate embodiment of the present invention, the present invention represents a computer program product that includes a computer readable medium having computer program logic recorded thereon. The computer program logic enables a computer system scope operating system semantics, as discussed above.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A computer program product comprising a computer readable medium having computer program logic recorded thereon for enabling a computer system to scope operating system semantics including entities and attributes in a computing environment having an operating system that conforms to an operating system interface standard and a process having at least one enclave executable in the computer system, said computer program product comprising:

means for enabling the computer system to scope environment variable type entities and attributes defined by said standard to said enclave; and     means for enabling the computer system to scope signal actions type entities and attributes defined by said standard to said enclave.

2. The computer program product of claim 1, wherein said computer program logic further comprises means for enabling the computer system to scope current working directory type entities and attributes defined by said standard to said process.

3. The computer program product of claim 1, wherein said standard is the portable operating system interface (POSIX) operating system interface standard.

4. A program storage device readable by a machine, tangibly embodying a program of instructions executable by the machine to perform method steps for scoping operating system semantics including entities and attributes in a computing environment in the machine having an operating system that conforms to an operating system interface standard, a process comprising at least one enclave executable in the machine, said method steps comprising:

scoping environment variable type entities and attributes defined by said standard to said enclave; and     scoping signal action type entities and attributes defined by said standard to said enclave.

5. The method of claim 4, further comprising the step of scoping current working directory type entities and attributes defined by said standard to said process.

6. The method of claim 4, wherein said standard is the portable operating system interface (POSIX) operating system interface standard.

\* \* \* \* \*